United States Patent [19]
Pollard

[11] 3,986,148
[45] Oct. 12, 1976

[54] WAVEGUIDE TO CO-AXIAL LINE JUNCTIONS

[75] Inventor: John Francis Pollard, Lincoln, England

[73] Assignee: English Electric Valve Company Limited, Chelmsford, England

[22] Filed: Nov. 13, 1975

[21] Appl. No.: 631,649

Related U.S. Application Data

[63] Continuation of Ser. No. 468,663, May 10, 1974, abandoned.

[30] Foreign Application Priority Data

May 12, 1973 United Kingdom............... 22742/73

[52] U.S. Cl................................... 333/7 R; 333/13; 333/21 R; 333/98 R
[51] Int. Cl.$^2$...................... H01P 1/14; H01P 1/16; H01P 5/12
[58] Field of Search............ 333/7 R, 7 D, 13, 21 R, 333/97 R, 97 S, 98 R, 35, 84 R

[56] References Cited
UNITED STATES PATENTS

| | | | |
|---|---|---|---|
| 2,759,099 | 8/1956 | Olive | 333/6 X |
| 3,720,888 | 3/1973 | Manuali | 333/7 D |

*Primary Examiner*—Alfred E. Smith
*Assistant Examiner*—Marvin Nussbaum
*Attorney, Agent, or Firm*—Baldwin, Wight & Brown

[57] ABSTRACT

A co-axial line to waveguide junction is formed from a length of waveguide with a co-axial line section along the length with the center conductor of the co-axial line entering the interior of the waveguide length. Connecting means are provided at each end of the length to enable connection of selectably short circuiting means. When any of the short circuiting means is in the short circuited state, a path is created between the co-axial line section and the other end of the waveguide length.

11 Claims, 6 Drawing Figures

WAVEGUIDE TO CO-AXIAL LINE JUNCTIONS

This is a continuation, of application Ser. No. 468,663 filed on May 10, 1974, and now abandoned.

This invention relates to waveguide to co-axial line junctions and in particular to such junctions suitable for use in connecting a transmitter or a receiver to an aerial in dependence upon whether or not the transmitter is operating.

BACKGROUND OF INVENTION

Figure 1:
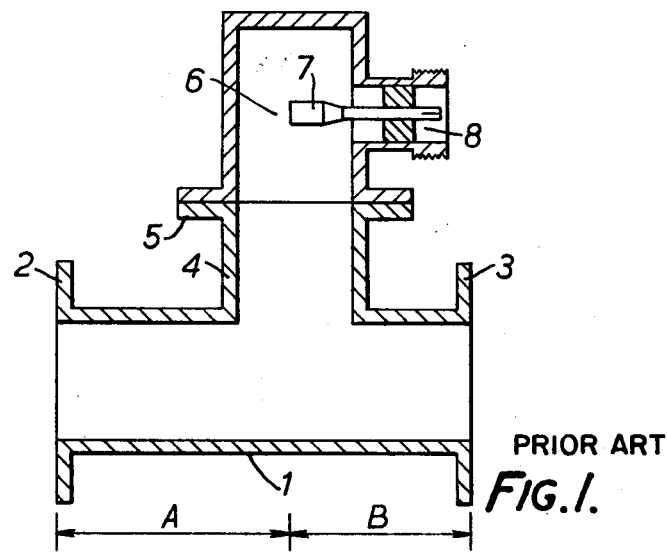

A typical known co-axial line to waveguide junction is shown in section in FIG. 1 of the accompanying drawings.

Referring to FIG. 1, a length of waveguide 1 has flanges 2 and 3 at each end. Flange 2 provides the means whereby a TR cell and an associated receiver may be connected, whilst flange 3 provides the means whereby a source of generated r.f. energy (e.g. a magnetron) to be transmitted may be connected. Along the length of the waveguide section 1, a further section of waveguide 4 is joined. Waveguide section 4 has, at its end remote from the waveguide section 1, a flange 5, by means of which a cavity 6 is connected. Introduced into cavity 6 is the inner conductor 7 of a co-axial line connector 8. Co-axial line connector 8 is provided to receive the co-axial transmission line leading to a common transmitter/receiver aerial.

The distance A between the centre of the waveguide section 4 and the effective short circuit provided by a TR cell connected to flange 2 is such that when the TR cell is switched on by r.f. energy originating from the r.f. source connected to flange 3, a short circuit is transformed to the junction of the waveguide sections 4 and 1, such that effectively a waveguide bend is produced, so that r.f. energy is coupled from the r.f. source connected to flange 3 to the cavity 6 and thus to the co-axial line connector 8.

The distance B from the centre of waveguide section 4 to the flange 3 is chosen such that when the r.f. source is inoperative, a short circuit is transformed to the junction of the waveguide sections 4 and 1, such that a waveguide bend is effectively provided connecting the co-axial line connector 8, via the cavity 6 to the receiver connected to flange 2.

Not only is the co-axial line to waveguide junction described above undesirably large for many purposes, but also the extensive cavities within the junction tend to sustain parasitic modes.

SUMMARY OF INVENTION

The present invention seeks to provide an improved co-axial line to waveguide junction in which the above mentioned difficulties are reduced.

According to this invention a co-axial line to waveguide junction comprises a length of waveguide having at each end means for connecting selectably short circuiting means and a co-axial line section arranged along the length thereof, the central conductor of which line extends into the interior of said waveguide length and the distances from said central conductor to each of said connecting means at the end of said waveguide section being chosen such that when a selectably short circuiting means at one end of said waveguide is rendered short circuiting, a path between the other end of said waveguide section and said co-axial line section is established and vice versa. Normally the distance between the central conductor of said co-axial line section and the effective location of a short circuit provided by a selectably short circuiting means is one quarter of an operating wavelength and thus the distance between the central conductor of said co-axial line section and the means for connecting the selectably short circuiting means to the waveguide section is less than a quarter of an operating wavelength depending upon the design of the selectably short circuiting means in question.

Where the co-axial line to waveguide junction provided by the present invention is utilised to connect a magnetron and a receiver to a common aerial, a TR cell in the path to a receiver constitutes one of said selectably short circuiting means, whilst the other selectably short circuiting means is constituted by said magnetron or an ATR cell in the path of energy from said magnetron.

Said co-axial line section may be a co-axial line connector provided to accept a co-axial line acting as the feeder of an aerial.

In another embodiment of the invention, however, the central conductor of said co-axial line section extends from the interior of said waveguide into a cavity forming part of an additional waveguide section provided to accept a length of waveguide acting as the feeder of an aerial.

The invention is illustrated in and further described with reference to FIGS. 2, 3, 4 and 5 of the accompanying drawings.

BRIEF DESCRIPTION OF DRAWING FIGURES

The aforementioned FIG. 1 depicts a typical known coaxial line to waveguide junction in section.

Figure 2:
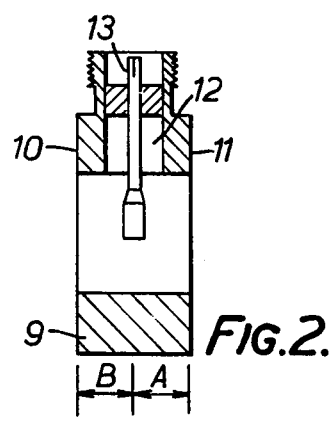
Figure 3:
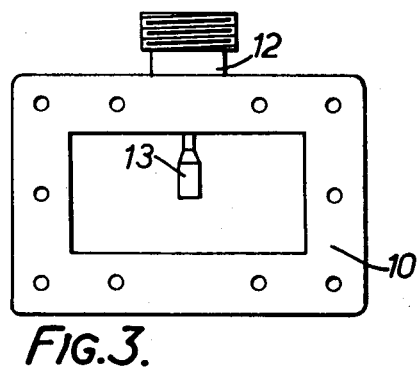
Figure 4:
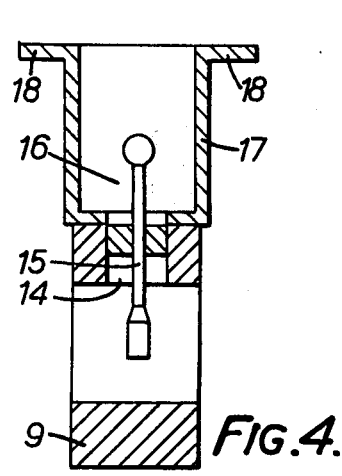
Figure 5:
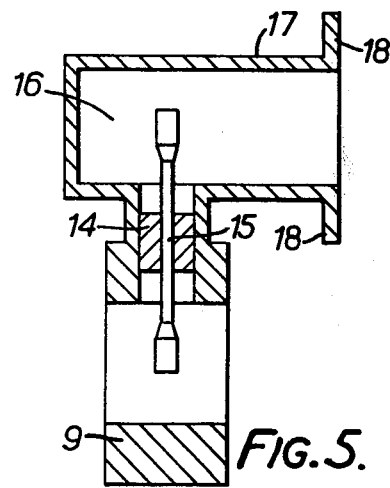
Figure 6:
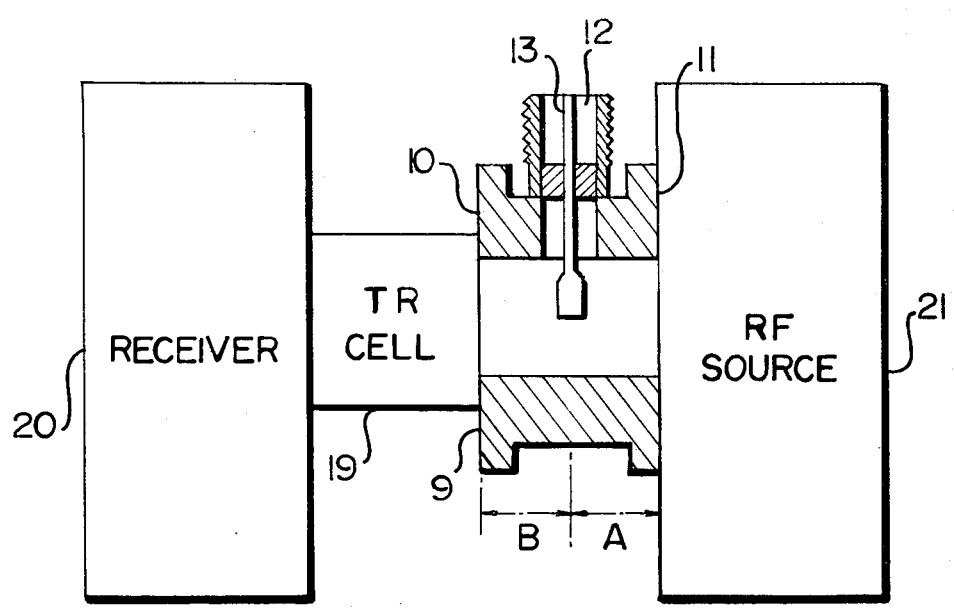

FIG. 2 is a section along the length of a co-axial line to waveguide junction in accordance with the present invention, FIG. 3 is a cross section of the co-axial line to waveguide junction of FIG. 2, FIGS. 4 and 5 are cross sections of two further embodiments of the present invention FIG. 6 is a diagrammatic display of the coaxial line to waveguide junction employed with an r.f. source and a receiver.

Referring to FIGS. 2, 3 and 6 a short length of waveguide 9 is provided with ends 10 and 11, one of which, 10, is provided to have connected thereto a TR cell 19 and an associated receiver 20, whilst the other end of which 11, is provided to receive the output arrangement of an r.f. source 21 which could be a magnetron or an ATR cell provided in the path between the end 11 and a magnetron. Symmetrically disposed along the length of the waveguide section 9 is a co-axial line connector 12, the inner conductor 13 of which extends into the interior of the waveguide section 9. The distance A between the central conductor 13 and the waveguide end 11 is chosen such that when the magnetron 21 is inoperative, the short circuit thereby provided, or alternatively the short circuit provided by the interposed TB or ATR cell, is transformed to the region of the co-axial connector 12, so as to establish a path between the co-axial connector 12 and the end 10 of the waveguide section 9.

The length B between the central conductor 13 and the waveguide end 10 is provided to be such that when, in response to r.f. energy originating from the magnetron 21 connected to waveguide end 11, a short circuit is provided by the TR cell 19 connected to waveguide end 10, the short circuit is transformed to the region of the co-axial connector 12 to establish a path between the co-axial connector 12 and the waveguide end 11.

In practice, the distance between the central conductor 13 of the co-axial connector 12 and either the short circuit provided by the TR cell 19, the ATR cell or the magnetron 21 is arranged to be one quarter of an operating wavelength and thus the distance between the central conductor 13 and the waveguide ends 10 and 11 will be less than a quarter of an operating wavelength, depending upon the nature of the TR cell 19, the TR or ATR cell or the magnetron 21 connected thereto.

Referring to FIGS. 4 and 5, the arrangement illustrated therein is essentially similar to that shown in FIGS. 2 and 3 except that the co-axial connector 12 of FIGS. 2 and 3 is replaced by a length of co-axial transmission line 14, the central conductor 15 of which extends from the interior of the length of waveguide 9 to a cavity 16 forming part of a further length of waveguide 17 having flanges 18 to which a length of waveguide forming the feeder for an aerial may be connected.

Comparing FIGS. 2, 3 and 6 or FIGS. 4 and 5, with the known arrangement shown in FIG. 1, it will be seen that the overall dimensions of a co-axial line to waveguide junction provided in accordance with the present invention may be very much reduced compared with a comparably known co-axial line to waveguide junction. At the same time there is less tendency for parasitic modes to be supported.

I claim:
1. In combination with a duplexer having three separate ports, an antenna connected to one port, selectably short circuiting means connected to a second port for coupling said one port to the remaining port in response to generated r.f. energy entering said remaining port, receiving means connected to said selectably short circuiting means for receiving r.f. energy from said one port, r.f. source means connected to said remaining port for selectively generating r.f. energy and for effecting a short circuit which couples said one port to said second port in the absence of generated r.f. energy, the improvement wherein said duplexer comprises:
   a straight waveguide section having opposite end faces defining said second port and said remaining port, respectively;
   a transmission line intersecting said waveguide section between said opposite end faces, said transmission line comprising an inner conductor and a hollow outer conductor defining said one port and said outer conductor having an inner transverse dimension extending axially with respect to said waveguide section, which inner transverse dimension is significantly less than one-half wavelength of said r.f. energy, the distance between said inner conductor and that end face defining said second port being less than one-quarter wavelength of said r.f. energy by that amount sufficient to establish one-quarter wavelength between the short circuit provided by said selectably short circuiting means and said inner conductor, whereby said duplexer is of compact form and is not propense to sustain parasitic modes.

2. In the combination as defined in claim 1 wherein that end face of the waveguide section which defines said remaining port is spaced from said inner conductor a distance less than one-quarter wavelength of said r.f. energy by that amount sufficient to establish one-quarter wavelength between the short circuit provided by said r.f. source means and said inner conductor.

3. In the combination as defined in claim 1 wherein said selectably short circuiting means is a TR cell.

4. In the combination as recited in claim 1 wherein said transmission line is a coaxial line connector operative to receive a coaxial line leading to the aerial.

5. In the combination as recited in claim 1 including a second waveguide section located at the other end of said transmission line from said straight waveguide section and comprised in part of a cavity into which the inner conductor of said transmission line extends, and having flanges to which a length of waveguide forming the feeder of an aerial may be connected.

6. A duplexer for enabling a transmitter and a receiver selectively to be coupled to an antenna, comprising in combination:
   a straight waveguide section having opposite end faces adapted to be connected to an r.f. source and to a receiver respectively;
   a transmission line intersecting said waveguide section between said opposite end faces and perpendicular to such waveguide section, said transmission line comprising an inner conductor and a hollow outer conductor communicating with the interior of said waveguide section, said inner conductor being coaxial with said outer conductor and projecting into the interior of said waveguide section and said outer conductor having an inner dimension which extends axially with respect to said waveguide section and is significantly less than ½ wavelength of the r.f. energy to be handled, whereby the distance between said inner conductor and at least one end face of said waveguide section may be made not greater than ¼ wavelength of the r.f. energy; and
   said one end face of the waveguide section being disposed not greater than ¼ wavelength of the r.f. energy from said inner conductor whereby said duplexer is of compact form and is not propense to sustain parasitic modes.

7. A duplexer as recited in claim 6 wherein said transmission line is a coaxial line connector operative to receive a coaxial line leading to the aerial.

8. A duplexer as recited in claim 6 including a second waveguide section located at the other end of said transmission line from said straight waveguide section and comprised in part of a cavity into which the inner conductor of said transmission line extends, and having flanges to which a length of waveguide forming the feeder of an aerial may be connected.

9. A duplexer as defined in claim 6 wherein the other end face of said waveguide section also is disposed less than ¼ wavelength of the r.f. energy from said inner conductor.

10. In a duplexer for selectively coupling a transmitter and a receiver operating at a selected r.f. wavelength to an antenna, said duplexer comprising a straight waveguide section having opposite end faces adapted to be connected respectively to a transmitter and a receiver, and a transmission line intersecting said waveguide section between said end faces, said transmission line including a hollow outer conductor and, coaxial with said outer conductor, an inner conductor extending into the the confines of said transmission line, a selected one of a transmitter and a receiver being coupled to said antenna in response to a short circuit created in the vicinity of one of said end faces; the improvement wherein said transmission line is disposed perpendicular to the length of said waveguide section and said inner conductor extends into the confines of said straight waveguide section at a point wherein said inner conductor is spaced from said one of said end faces by a distance not greater than one-quarter of said selected wavelength and from a short circuit created in the vicinity of said one end face by a distance which is one-quarter of said selected wavelength so that said duplexer is, as a result, so limited in size as to be compact in form and not propense to sustain parasitic modes.

11. In a duplexer as recited in claim 10 wherein said inner conductor is spaced from both of said end faces by a distance not greater than one-quarter of said selected wavelength and from a short circuit selectively created in the vicinity of either of said end faces by a distance which is one-quarter of said selected wavelength.

* * * * *